(12) United States Patent
Bailey

(10) Patent No.: US 12,589,785 B2
(45) Date of Patent: *Mar. 31, 2026

(54) COLLISION PROTECTION AND SAFETY SYSTEM FOR RAIL VEHICLES

(71) Applicant: HARSCO TECHNOLOGIES, LLC, Fairmont, MN (US)

(72) Inventor: Shannon Bailey, Newton, NJ (US)

(73) Assignee: Harsco Technologies, LLC, Fairmont, MN (US)

(*) Notice: Subject to any disclaimer, the term of this patent is extended or adjusted under 35 U.S.C. 154(b) by 33 days.

This patent is subject to a terminal disclaimer.

(21) Appl. No.: 18/407,328

(22) Filed: Jan. 8, 2024

(65) Prior Publication Data

US 2025/0026387 A1     Jan. 23, 2025

Related U.S. Application Data

(63) Continuation of application No. 17/248,130, filed on Jan. 11, 2021, now Pat. No. 11,866,077, which is a
(Continued)

(51) Int. Cl.
*B61L 23/06* (2006.01)
*B61L 23/00* (2006.01)
(Continued)

(52) U.S. Cl.
CPC ............... *B61L 23/06* (2013.01); *B61L 23/00* (2013.01); *B61L 23/14* (2013.01); *B61L 23/20* (2013.01);
(Continued)

(58) Field of Classification Search
CPC .......... B61L 23/06; B61L 23/00; B61L 23/14; B61L 23/20; B61L 23/24; B61L 23/34;
(Continued)

(56) References Cited

U.S. PATENT DOCUMENTS

| | | | |
|---|---|---|---|
| 5,554,982 A | 9/1996 | Shirkey et al. | |
| 5,758,583 A | 6/1998 | Lohr | |

(Continued)

FOREIGN PATENT DOCUMENTS

| | | |
|---|---|---|
| GB | 2 427 296 | 12/2006 |
| WO | WO 2016/054500 | 4/2016 |

OTHER PUBLICATIONS

International Search Report and the Written Opinion of the International Searching Authority issued on Nov. 8, 2017 in connection with International application No. PCT/US2017/048428.
(Continued)

*Primary Examiner* — Daryl C Pope
(74) *Attorney, Agent, or Firm* — Norton Rose Fulbright US LLP

(57) ABSTRACT

The present disclosure relates to a railway collision protection and safety system having a vehicle device located on rail vehicles at a work zone, a personal protection unit located with rail workers at the work zone, and a dispatcher processor at a control center. An authority limit within the work zone may be determined by the dispatcher processor, and an authority exceeded signal is sent to the rail vehicle when the rail vehicle is determined to exceed the authority limit.

20 Claims, 7 Drawing Sheets

Related U.S. Application Data continuation of application No. 15/685,103, filed on Aug. 24, 2017, now Pat. No. 10,889,310.

(60) Provisional application No. 62/379,012, filed on Aug. 24, 2016.

(51) Int. Cl.

| | | |
|---|---|---|
| *B61L 23/14* | (2006.01) | |
| *B61L 23/20* | (2006.01) | |
| *B61L 23/24* | (2006.01) | |
| *B61L 23/34* | (2006.01) | |
| *B61L 25/02* | (2006.01) | |
| *G01S 19/05* | (2010.01) | |
| *G01S 19/50* | (2010.01) | |

(52) U.S. Cl.
CPC .............. *B61L 23/24* (2013.01); *B61L 23/34* (2013.01); *B61L 25/025* (2013.01); *B61L 2205/04* (2013.01); *G01S 19/05* (2013.01); *G01S 19/50* (2013.01); *G01S 2205/002* (2013.01)

(58) Field of Classification Search
CPC .... B61L 25/025; B61L 2205/04; G01S 19/05; G01S 19/50; G01S 2205/002
See application file for complete search history.

(56) References Cited

U.S. PATENT DOCUMENTS

| | | | | |
|---|---|---|---|---|
| 6,145,792 | A | * | 11/2000 | Penza ..................... B61L 3/125 246/167 A |
| 6,218,961 | B1 | * | 4/2001 | Gross ................... B61L 25/025 246/126 |
| 7,789,020 | B2 | | 9/2010 | Li |
| 8,344,877 | B2 | * | 1/2013 | Sheardown ............. B61L 23/06 246/477 |
| 8,952,805 | B2 | | 2/2015 | Baines et al. |
| 9,365,155 | B2 | * | 6/2016 | Hathaway ................ G01S 7/10 |
| 10,106,079 | B2 | * | 10/2018 | Denny ..................... B60Q 7/00 |
| 2011/0006912 | A1 | | 1/2011 | Sheardown et al. |
| 2012/0296562 | A1 | | 11/2012 | Carlson et al. |
| 2013/0166114 | A1 | * | 6/2013 | Baines ................... B61L 23/06 340/539.13 |
| 2015/0060608 | A1 | * | 3/2015 | Carlson ................... B61L 27/70 246/122 R |
| 2015/0091716 | A1 | * | 4/2015 | Hathaway ............... G01S 7/003 340/435 |
| 2015/0097126 | A1 | | 4/2015 | Mccord |
| 2015/0329130 | A1 | | 11/2015 | Carlson et al. |
| 2016/0096537 | A1 | | 4/2016 | Bartek |
| 2017/0015336 | A1 | * | 1/2017 | Bartek ................. G08B 5/006 |
| 2017/0088046 | A1 | * | 3/2017 | Denny ................. H04W 24/04 |
| 2021/0046961 | A1 | * | 2/2021 | Whittemore ........... B61L 23/06 |

OTHER PUBLICATIONS

Supplementary Partial European Search Report issued in corresponding European U.S. Appl. No. 17/844,422, dated Mar. 25, 2020.

* cited by examiner

COLLISION PROTECTION AND SAFETY SYSTEM FOR RAIL VEHICLES

CROSS-REFERENCE TO RELATED APPLICATIONS

This application is a continuation of U.S. Ser. No. 17/248,130, filed Jan. 11, 2021, which is a continuation of U.S. Ser. No. 15/685,103, filed Aug. 24, 2017, issued as U.S. Pat. No. 10,889,310, which claims priority to U.S. Provisional App. Ser. No. 62/379,012, filed on Aug. 24, 2016, each of which are hereby incorporated by reference in their entirety.

BACKGROUND

In a work area for rail maintenance operations having a high volume of rail workers and rail maintenance vehicles, injuries to the rail workers and damage to the rail vehicles may occur. The safety risks are amplified when the work zone involves active track, which may accommodate travel of passenger and/or freight trains during the ordinary course of business.

Rail vehicles and workers may collide with one another if there is inadequate forewarning, and vehicles and workers may also inadvertently exit the work zone and into commercial train traffic without permission. Accordingly, improved systems and methods for improving rail worker and vehicle safety are needed.

BRIEF SUMMARY

The present disclosure generally relates to a system and method for monitoring the presence of rail workers and rail vehicles in a work zone of railroad track. Authority limits may be designated for the work zone that provide outer bounds for the rail workers and the rail vehicles. Should any of the rail workers or rail vehicles approach or exceed the authority limits, alarms may be generated to alert the rail worker and/or rail vehicle regarding violation of the authority limits. Real-time alerts provide a visual and/or audible warning that the authority limits have been breached and that the rail worker and/or vehicle must return to the designated work area. Such precautions are particularly useful when the rail workers and/or rail vehicles are operating on active track.

The present disclosure also relates to a system and method for detection conditions that may lead to a collision between rail workers and rail vehicles in the work zone. A distance measuring device located on each rail vehicle may be used to determine a distance between a first rail vehicle and another rail vehicle or rail worker. If the distance is less than a collision threshold, a first vehicle alarm mechanism of the first rail vehicle will issue a collision possible alarm to the first vehicle's operator. The first vehicle may also send a signal to the other rail vehicle or rail worker so that the alarm mechanism on the other rail vehicle or rail worker may also warn the respective operator/rail worker.

BRIEF DESCRIPTION OF THE DRAWINGS

Reference is now made to the following descriptions taken in conjunction with the accompanying drawings.

DETAILED DESCRIPTION

Various embodiments of a system and method for improving operating safety for rail workers and rail vehicles in a work area according to the present disclosure are described. In general, the safety system enhances rail vehicle safety by directing authority limit compliance, issuing proximity and collision warnings to rail vehicle operators and nearby rail vehicles and rail workers, gathering vehicle diagnostic maintenance information, and monitoring various other rail vehicle and rail worker information of the work zone. It is to be understood, however, that the following explanation is merely exemplary in describing the devices and methods of the present disclosure. Accordingly, several modifications, changes and substitutions are contemplated.

Figure 1:
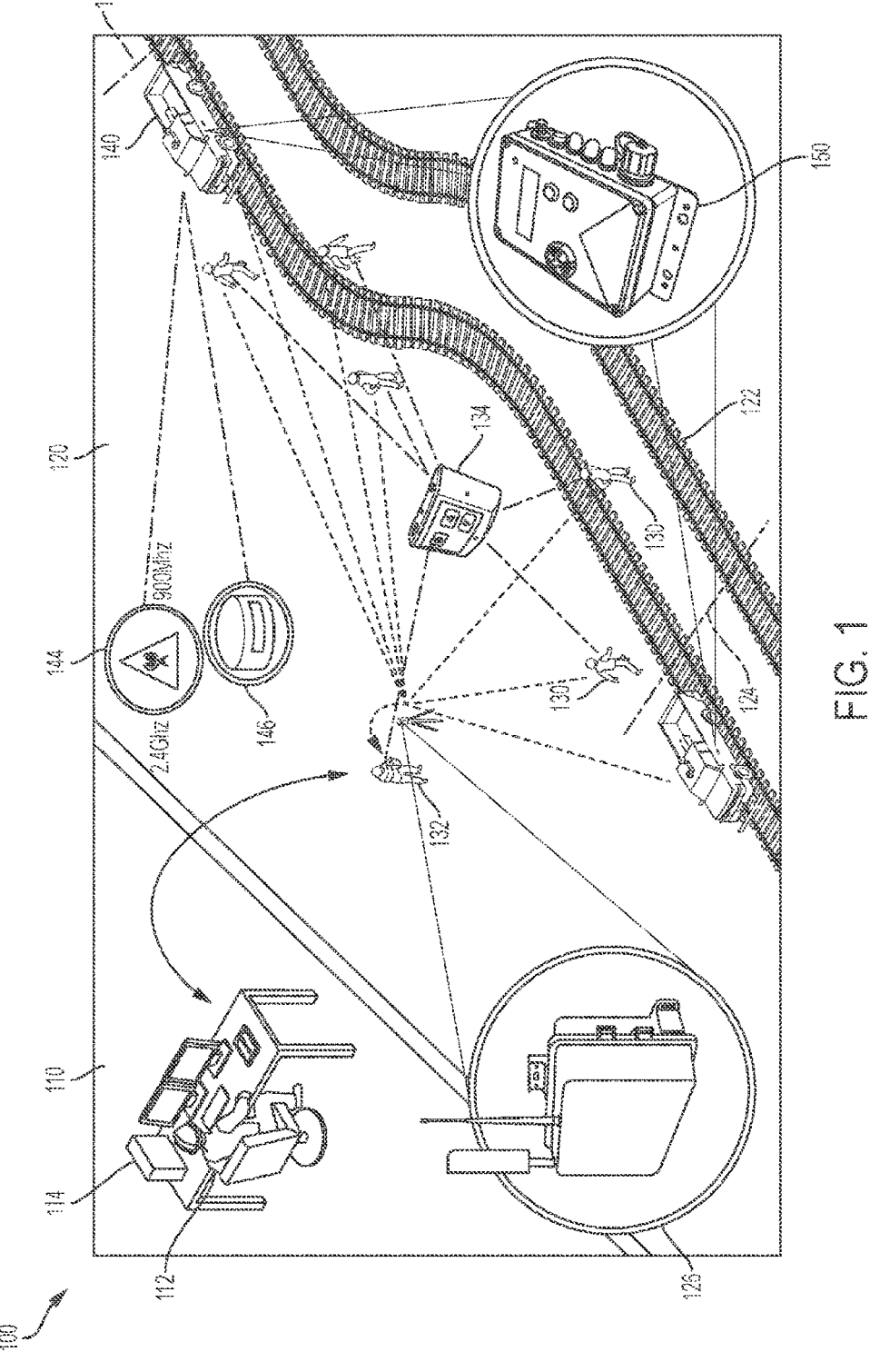
FIG. 1 is a system diagram illustrating a collision protection and safety system implemented at a control center and a work zone having rail workers and rail vehicles with authority limits.

Referring to FIG. 1, the safety system 100 may include a control center 110 that may include a dispatcher 112 and a dispatcher processor 114. The safety system 100 may further be implemented at a work zone 120 that may include a number of rail workers 130 and rail maintenance vehicles 140 that operate on and around a railroad track 122.

The work zone 120 may be a fixed work zone, or a moving work zone (e.g., a work zone that intermittently or continuously moves along the track). The rail vehicles 140 operating in the work zone 120 may include any rail maintenance vehicle, such as a tamper, a spike puller, a stoneblower, hy-rail vehicles (vehicles that can operate both on road and track), or any other maintenance of way (MOW) vehicle. The work zone 120 may also include a rail worker manager/flagger 132, and a wayside device 126.

The work zone 120 may be provided on an active track 122 that has active traffic such as passenger trains and freight trains. Accordingly, the safety system 100 may protect the rail workers 130 and rail vehicles 140 operating on the active track 122 from oncoming passenger and freight trains. The safety system 100 may include a number of Collision Location Protection (CLP) units 150 located on each rail vehicle 140. Each CLP unit 150 may include a display and an audible alarm units to interact with an operator of the rail vehicle 140. The CLP unit 150 may further include a visual alarm unit to issue a visual alarm to the operator.

Each rail vehicle 140 and rail worker 130 may further include one or more communication devices with which to communicate its respective location information. In an embodiment, each rail vehicle 140 and rail worker 130 may include a radio device 144, cellular device, or a global positioning system device 146 as a communication device. The radio device 144 may operate in the 2.4 GHz and 900 MHz spectrums, and may include 2.4 GHz CAS antennas and omni-directional 900 MHz antennas. In a particular embodiment, the radio device 144 is a 2.4 GHz chirping radio. The GPS device may also include a GPS antenna to enhance communication performance. In an embodiment, the radio device 144 and GPS device 146 are located within the CLP unit 150. By using these communication devices, the rail vehicle 140 or rail worker 130 may communicate its location to the dispatcher processor 114.

Each rail vehicle 140 may further include a telematics device that may be a distinct device or a part of the CLP unit 150. The telematics device may gather rail vehicle operation data in real time, and may communicate with other telematics devices in other rail vehicles 140 and/or with the dispatcher processor 114 at the control center 110. If the rail vehicle 140 is a hy-rail vehicle, a hy-rail detection sensor may be included in the hy-rail vehicle to determine if the hy-rail vehicle is in an on-track mode or on-road mode. If the hy-rail vehicle is determined to be operating in the on-road mode, the audible and visual alarm units may be deactivated so that the hy-rail vehicle may travel outside of the authority limit without being alarmed.

Each rail worker 130 may have a personal protection unit (PPU) 134. The rail worker manager or flagger 132, in addition to the PPU 134, may also have a manager device, flagger unit, portable warning horn, or light unit. Each of the PPUs 134 may include an audio alarm device that issues one or more types of audio alarm, and a visual alarm device that issues one or more type of visual alarm. In an embodiment, flashing lights is a type of visual alarm. Each of the PPUs 134 may also vibrate to provide a physical alarm to the rail workers. In addition, the PPUs 134 may each further include an acknowledgement interface, where the rail worker 130 may interact with the acknowledgement interface to switch off any type of activated alarms. Each PPU 134 may also include a radio, a battery, and a clip to be worn on clothing such as a safety vest or belt. In an embodiment, the PPU 134 may include a 900 MHz radio or a 2.4 GHz chirping radio with which to communicate with the CLP unit 150, or the dispatcher processor 114. In another embodiment, each PPU 134 may communicate with the CLP unit 150 or the dispatcher processor 114 via internet, local network, cellular, blue tooth, Wi-Fi, radio, or other communication mediums.

If the work zone 120 has no obstructions to normal communication, each of the CLP units 150 may communicate directly with the PPUs 134, with other CLP units 150 in other rail vehicles 140, and with the dispatcher processor 114, via internet, local network, blue tooth, radio, cellular, Wi-Fi, or other communicates medium. However, in work zones having tunnels and dark territories where standard communications links are not available, the wayside device 126 may provide an intermediary/relay/communications extender between the CLP units 150, the PPUs 134, and the dispatcher processor 114. The wayside device 126 may be placed near a particular track location at the work zone 120. For example, the dispatcher processor 114 may communicate with the wayside device 126 through standard communication protocol, and then the wayside device 126 can communicate with the PPUs 134 and CLP units 150 using radio, cellular, Wi-Fi, or other communications mediums. In an embodiment, the wayside device 126 may communicate with the PPUs 134 and the CLP units 150 using 900 MHz spread spectrum and 2.4 GHz chirping spread spectrum. Specifically, the wayside device 126 may communicate with the 900 MHz radios communication devices of rail workers 130 and rail vehicles 140. The wayside unit 126 may also be used at work zones 120 free of obstructions to normal communication. In an embodiment, the wayside unit 126 may also include an alarm mechanism to alert surrounding workers that one of the rail vehicles is within proximity to the wayside unit 126.

The dispatcher processor 114 and CLP units 150 may include computer-readable mediums having instructions to execute and carry out particular functions and steps of an embodiment of the present disclosure. The dispatcher processor 114 may be operable to receive input from the dispatcher through keyboard, mouse, touch screen, voice recoding, image recognition, or other devices for input reception. The CLP units 150 may also receive input from the vehicle operator 142 via a CLP unit input device.

Figure 2:
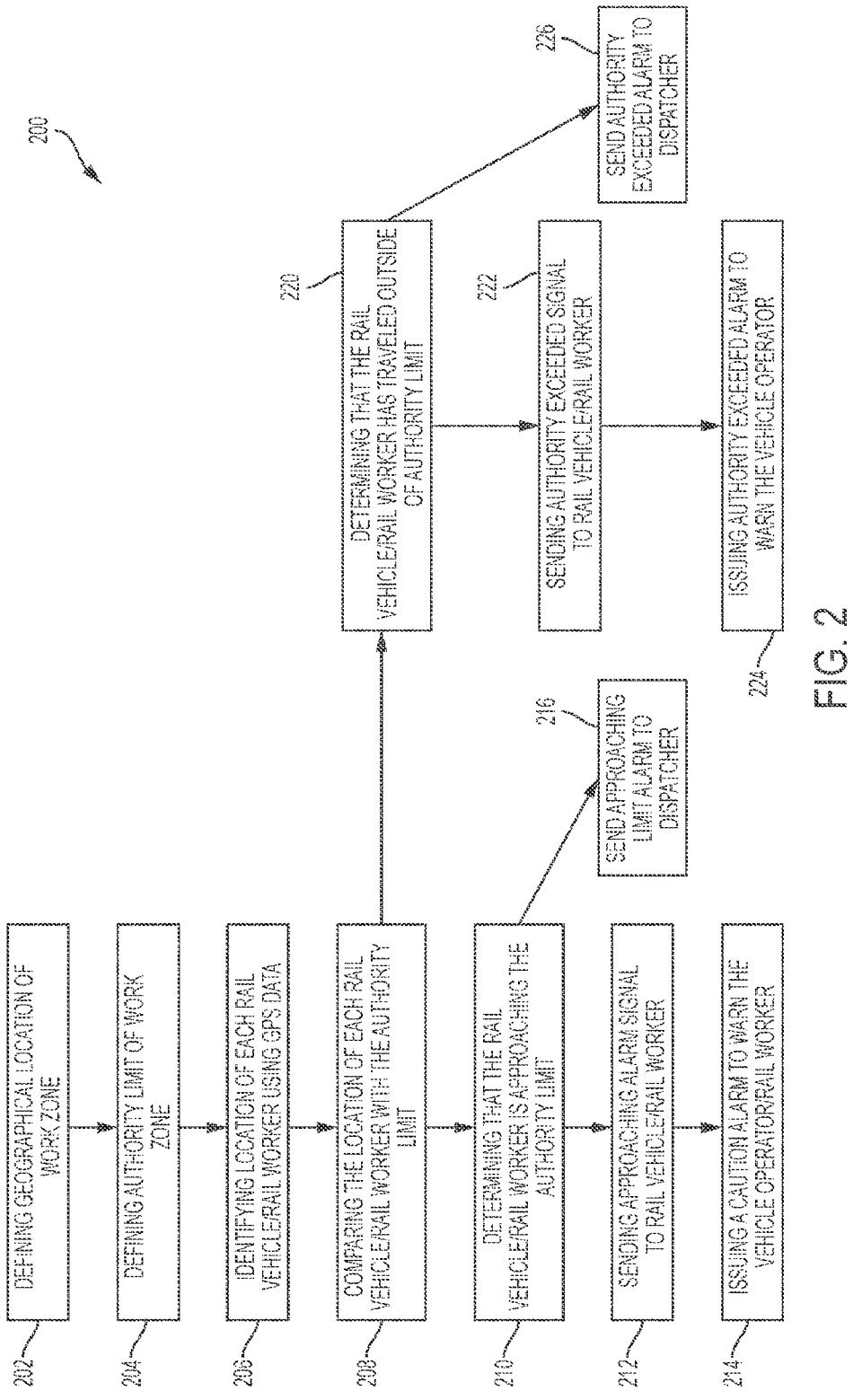
FIG. 2 is a flow chart illustrating an exemplary method of managing rail vehicle and rail worker location within authority limits.

FIG. 2 illustrates a flow chart 200 illustrating an exemplary method of managing rail vehicle and rail worker location within authority limits. An aspect of the safety system 100 is to designate authority limits 124 at specific locations of the work zone 120 to demarcate limits or boundaries beyond which the rail workers 130 and rail vehicles 140 are not permitted to pass. At step 202, the dispatcher processor 114 identifies a geographical location of each work zone 120 and stores the geographical location. The geographical location of each work zone 120 may include a railway tracks map having mile post information or a set of GPS coordinates defining the geographical location of each work zone 120. If the work zone 120 is a moving work zone, the geographical location of the moving work zone may be updated in real time as the work zone 120 changes relative to the rail tracks. In an embodiment, the CLP unit 150 may store the geographical location of the work zone 120 that was received from the dispatcher processor 114.

At step 204, the dispatcher processor 114 identifies an authority limit 124 of each work zone. The authority limit 124 outlines a location within where the rail vehicles 140 or rail worker 130 may operate within the work zone 120. The authority limits 124 of each work zone may be stored in the dispatcher processor 114, each PPU 134 of each rail worker 130, and/or each CLP 150 of each rail vehicle 140. In an embodiment, the authority limit 124 may be the outer boundary of each work zone 120 or other specified locations within the work zone 120. In an embodiment, different sets of authority limits 124 may be designated for each work zone 120. For example, the rail workers 130 may be authorized to operate within a first set of authority limits 124, and the rail vehicle 140 may be authorized to operate within a second set of authority limits 124. In an embodiment, the authority limits 124 may be designated as a set of GPS coordinates, mile marker information, or any other geographical location information relative to the railway tracks 122. In an embodiment, if the work zone 120 is a moving work zone, the authority limits 124 of the moving work zone may be updated in real time to move along with the moving work zone. In an embodiment, the rail vehicles 140 must be given authorization to operate within the authority limits 124. This authorization may be provided by the dispatcher processor 114 when the rail vehicle's operator enters, into the CLP input device, an authorization information that corresponds to the vehicle's authorization information stored in the dispatcher processor 114.

During operation, each rail vehicle 140 and rail worker 130 may move within the work zone 120 as needed. At step 206, the GPS device 146 of each rail vehicle 140 sends the location coordinates of the corresponding rail vehicle 140 to the dispatcher processor 114, so that the dispatcher processor 114 monitors the location of all rail vehicles 140 in the work zone 120.

At step 208, the dispatcher processor 114 may continuously compare each of the received location coordinates of a rail vehicle 140 with the corresponding authority limits 124 of that rail vehicle 140. At step 210, if the dispatcher processor 114 determines that the rail vehicle 140 is approaching the authority limits 124 such that the rail vehicle 140 is within a predetermined proximity distance from an authority limit 124, the dispatcher processor 114 may send an approaching alarm signal to the CLP unit 150 of the rail vehicle 140 at step 212. In response, at step 214, the CLP unit 150 of the rail vehicle 140 may issue a caution alarm to warn the operator 142 of the rail vehicle 140 that the rail vehicle 140 is approaching the authority limit 124 of the rail vehicle's operation. The caution alarm may include an audible alarm issued by the audible alarm unit of the CLP 150, a visual alarm issued by the visual alarm unit, another visual alarm issued by the display of the CLP 150, or a combination thereof. In an embodiment, when the dispatcher processor 114 sends the approaching alarm signal to the CLP unit 150 at 212, the dispatcher processor 114 may also send a vehicle approaching limit alarm to the dispatcher at step 216. The vehicle approaching limit alarm may include sounding an audio alarm and visually displaying the rail vehicle's work zone 120, location coordinates, and rail vehicle information to the dispatcher 112.

At step 220, the dispatcher processor 114 may determine that one of the rail vehicles 140 has exceeded an authority limit 124 by traveling outside of the authority limit 124. Subsequently at step 222, the dispatcher processor 114 may send an authority exceeded signal to the CLP unit 150 of the exceeding vehicle 140. At step 224, in response to the authority exceeded signal, the CLP unit 150 of the exceeding vehicle 140 may issue an authority exceeded alarm to warn the operator of the rail vehicle 140 that the rail vehicle 140 has exceeded the authority limit 124 of the rail vehicle's operation. The authority exceeded alarm may include an audible alarm issued by the audible alarm unit, a visual alarm issued by the visual alarm unit, another visual alarm issued by the display, or a combination thereof. In an embodiment, when the dispatcher processor 114 sends the authority exceeded signal to the CLP unit 150 at 222, the dispatcher processor 114 may also send a vehicle authority exceeded alarm to the dispatcher 112 at step 226.

The above described alarms may also include sounding an audio alarm and visually displaying the rail vehicle's work, location, and other relative rail information to the dispatcher 112. In an embodiment, the authority exceeded alarm issued to the operator is different from the caution alarm issued to the operator, so that the vehicle operator may distinguish between the severity of the rail vehicle's situation based on the alarm received.

Figure 3:
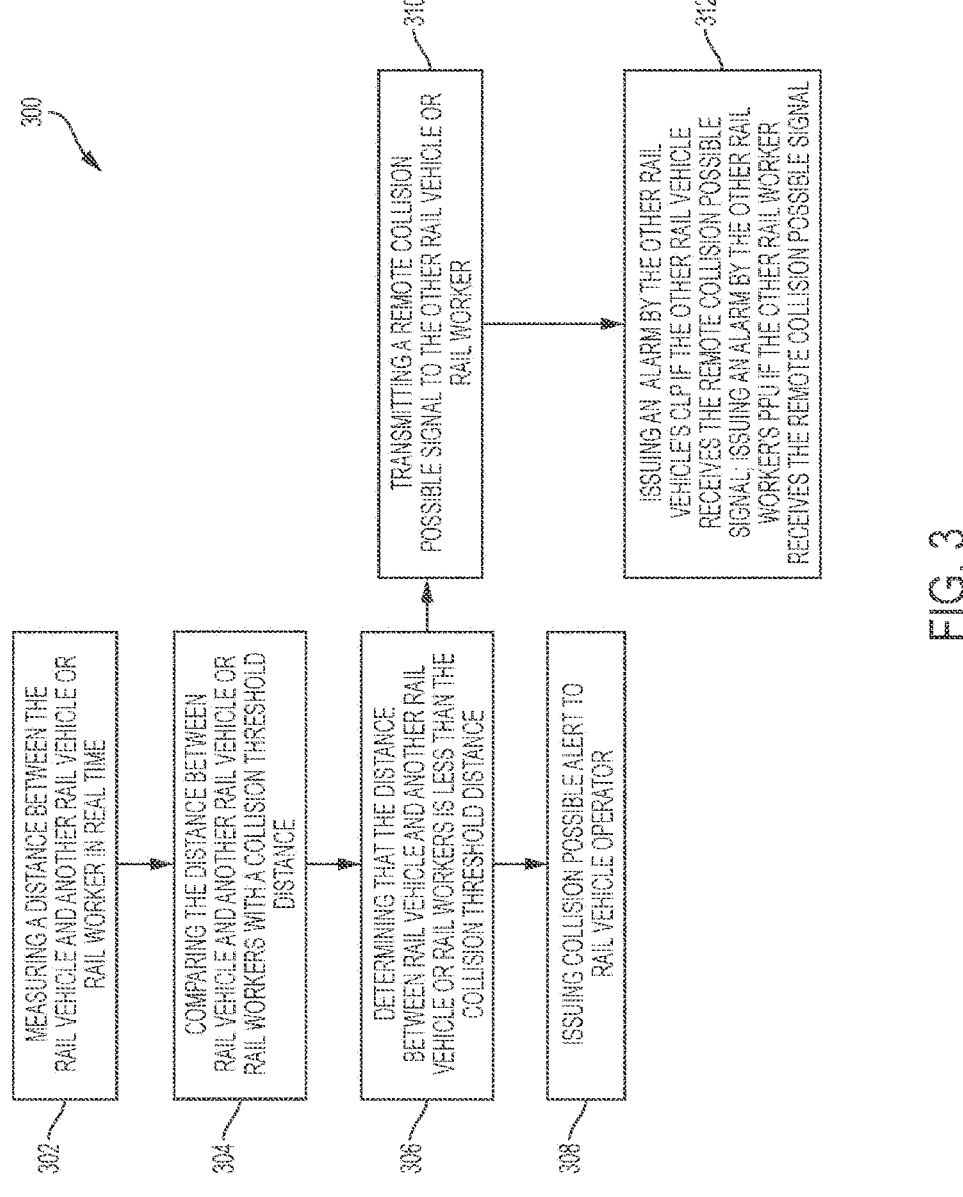
FIG. 3 is a flow chart illustrating an exemplary method of monitoring and issuing warnings of potential collisions between rail vehicles and rail workers.

FIG. 3 illustrates a flow chart 300 illustrating an exemplary method of monitoring and issuing warnings of potential collisions between rail vehicles and rail workers. At step 302, each rail vehicle 140 of the work zone 120 may use a measuring device to measure a distance between the rail vehicle 140 and other rail vehicles 140 and rail workers 130. In an embodiment, the measuring may be performed in real time so that the distance between the rail vehicle 140 and each of the other rail vehicles 140 and rail workers 130 may be continuously measured and updated. The measuring device may be a 2.4 GHz chirping radio, where the chirping radio may further utilize the two directional 2.4 GHz antennas 144. At step 304, the CLP unit 150 continuously compares the measured distances with a collision threshold distance. At step 306, if the CLP unit 150 determines that one of the measured distances is less than the collision threshold distance, the rail vehicle 140 is determined to be at risk of collision with one of the other rail vehicles or rail workers. As a result, at step 308, the CLP unit 150 issues a collision possible alert to the rail vehicle's operator using the audio alarm unit and the visual alarm unit of the rail vehicle. At step 310, the CLP unit 150 transmits a remote collision possible signal to other rail vehicles or rail workers determined to be too close to the rail vehicle 140. At step 312, when the other vehicle or worker receives the remote collision possible signal, the other vehicle's CLP unit 150 or the other worker's PPU 134 may issue an audio and/or visual alarm to warn the operator of the other vehicle or the rail worker respectively.

Figure 4:
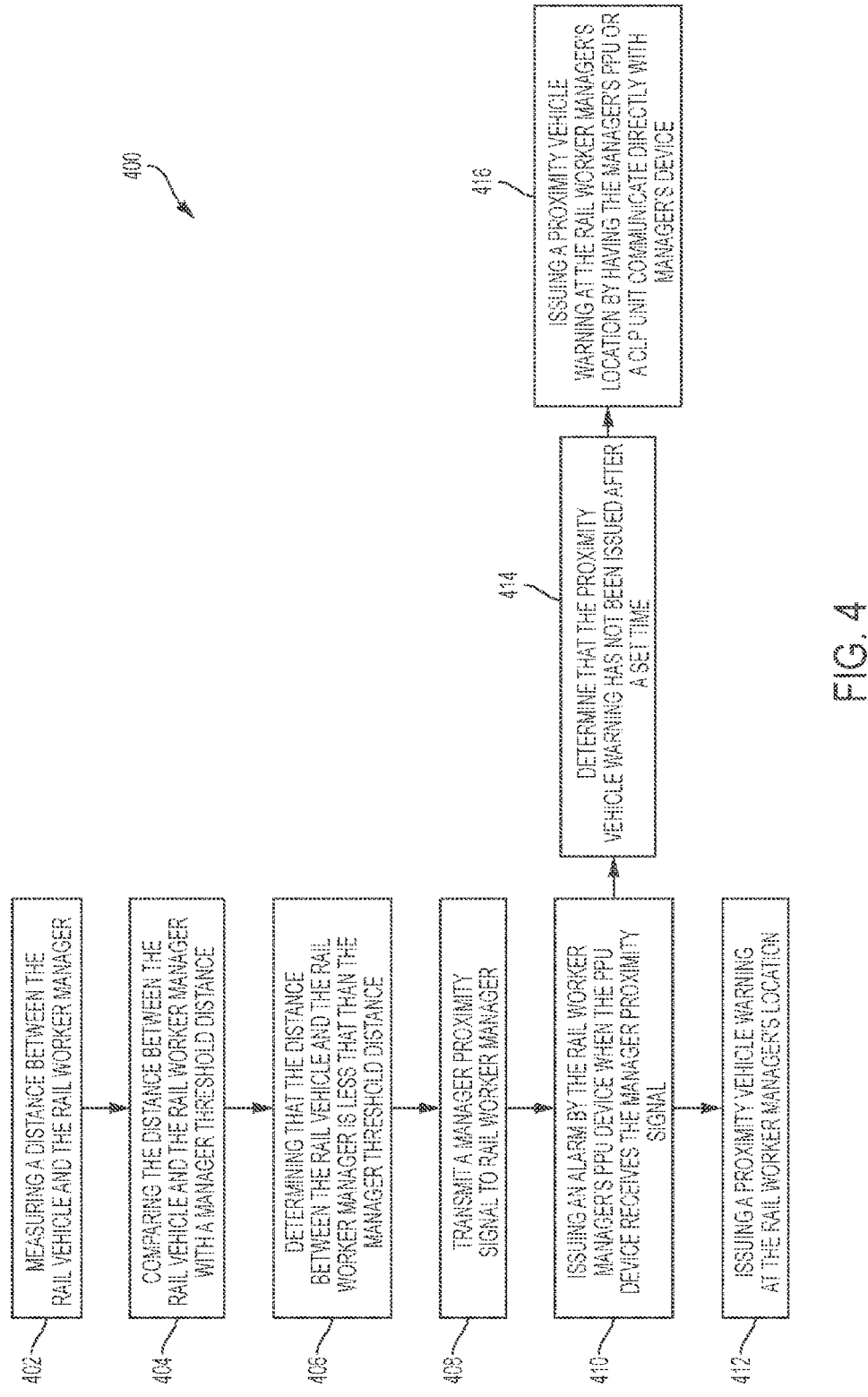
FIG. 4 is a flow chart illustrating an exemplary method of monitoring distance between a rail vehicle and a rail worker manager and issuing proximity vehicle via the rail worker manager.

FIG. 4 shows a flow chart 400 illustrating an exemplary method of monitoring the distance between a rail vehicle and a rail worker manager and issuing proximity vehicle warning via the rail worker manager. Specifically, the safety system 100 may utilize the rail worker manager/flagger 132 to issue a proximity vehicle warning to the area of the tracks around the rail worker manager 132. At step 402, the measuring device of the rail vehicle 140 may measure a distance between the rail vehicle 140 and the rail worker manager 132. At step 404, the CLP unit 150 of the rail vehicle 140 continuously compares the measured manager distance with a manager threshold distance. At step 406, if the measured manager distance is below the manager threshold distance, the rail worker manager 132 is determined to be within an immediate proximity of the rail vehicle 140. As a result at step 408, the CLP unit 150 may issue a manager proximity signal to the rail worker manager 132. At step 410, the rail worker manager's PPU 134 may receive the manager proximity signal from the rail vehicle's CLP unit 150, and the PPU 134 may subsequently issue an audio and/or visual alarm. At step 412, the manager 132, upon receiving the audio and/or visual alarm of the manager's PPU 134, may issue a proximity vehicle warning using the manager's manager device, flagger unit, portable warning horn, or light unit, so that rail workers 130 within the work zone 120 may be alerted to the approximate location of the rail vehicle 140 relative to the work zone 120. In an embodiment, the CLP unit 150 transmits the manager proximity signal to the rail worker manager using a 900 MHz radio. The 900 MHz radio may further use the omni directional 900 MHz antenna for enhanced communication. In an embodiment at 414, if the manager 132 fails to issue the proximity vehicle warning after a set amount of time, the CLP unit 150 or manager's PPU 134 may communicate directly with the manager's manager device, flagger unit, portable warning horn, or light unit to issue the proximity vehicle warning at 416.

In an embodiment of the safety system 100, vehicle information of each rail vehicle may be collected, monitored, and sent to the dispatcher processor 114. Specifically, each rail vehicle 140 may include a telematics device that receives and stores the vehicle maintenance, data reporting, vehicle logistics, engine fault, and other vehicle information. The telematics device of the rail vehicle 140 may further receive and store, as vehicle alert data, information related to the occurrence of all received and sent alert signals and audio/visual alarms issued by the CLP unit 150 of the rail vehicle 140. The telematics device may further transfer the monitored vehicle information and vehicle alert data to the dispatcher processor 114 via a communications medium. In an embodiment, the telematics device may be part of the CLP unit 150, or an independent unit that may communicate with the CLP unit 150. In an embodiment, the dispatcher 112 may remotely access the telematics device via the cellular or satellite communications medium of the telematics device, so that the dispatcher 112 may review all vehicle information and vehicle alert data of the vehicle. In an embodiment, dispatcher processor 114 may further be accessed by the dispatcher 112 or a supervisor to review any rail vehicle operator's 142 and rail worker's 130 performance.

Figure 5:
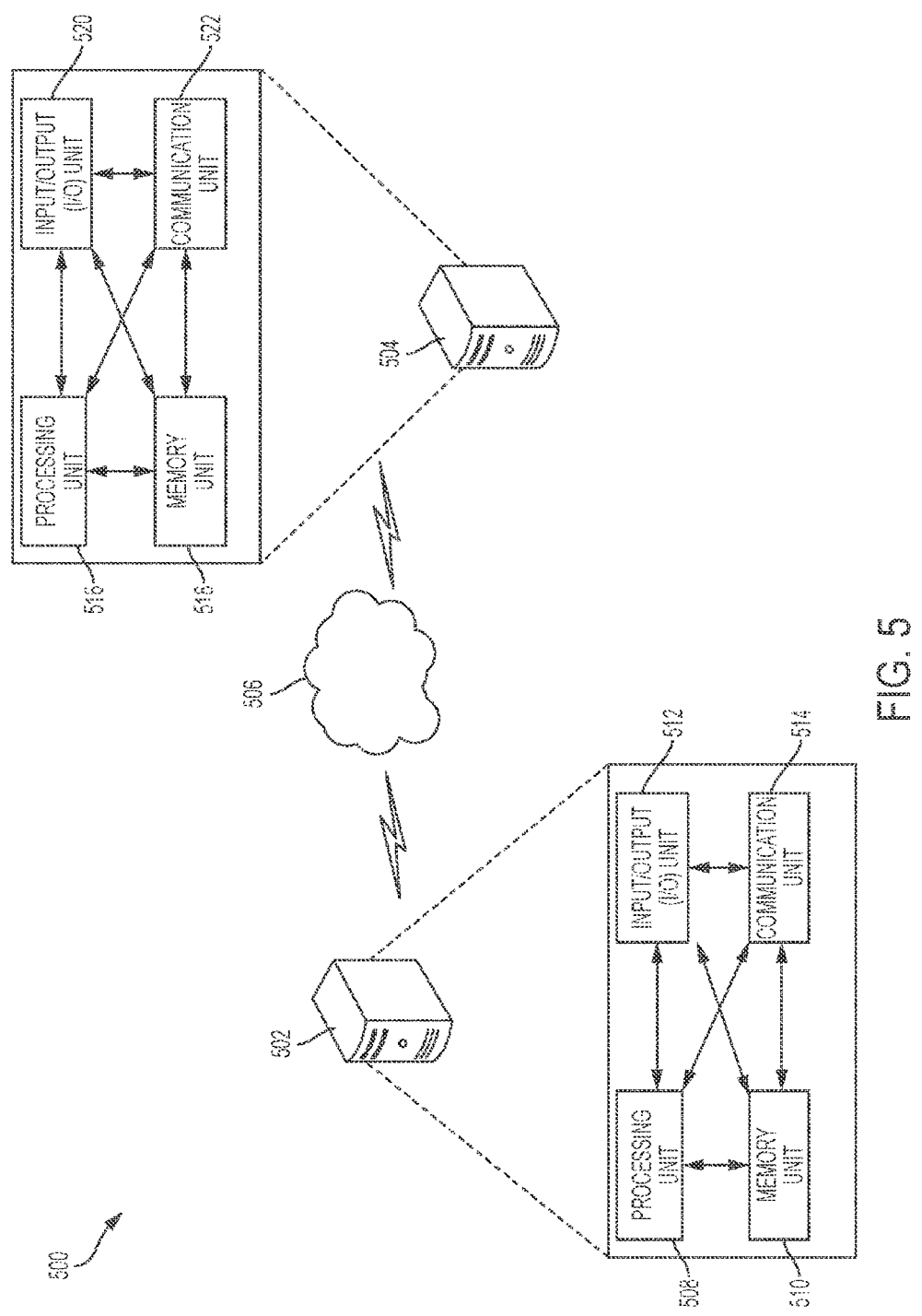
FIG. 5 is a system diagram of an exemplary computing system according to the present disclosure.

FIG. 5 illustrates a computing system 500 of the safety system 100. In some embodiments, the computing system 500 may include a first server 502 and a second server 504. The first server 502 may be associated with the dispatcher processor 114, whereas the second server 504 may be associated with an offsite computing system (e.g. CLP unit 150).

The first server 502 and the second server 504 may be communicatively coupled to one another by a network 506 as described herein. As such, a variety of data may be transmitted between the first server 502 and the second server 504 during collision detection and authority limit monitoring processes described herein. The network 506 may include any wireless and/or wired communications network that facilitates communication between the first server 502 and the second server 504, as well as between any other computing devices (e.g., a user's smartphone, a third party server, and/or the like). For example, the network 506 may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a controller area network (CAN), and/or the like. In some embodiments, the network 506 may also include a plurality of networks.

The first server 502 may be associated with the dispatcher processor 114. For example, the first server 502 may operate of electronics included in the dispatcher processor 114. In some embodiments, the first server 502 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The first server 502 may also include multiple servers and/or computing devices configured to communicate with one another and/or implement techniques described herein.

Figure 6:
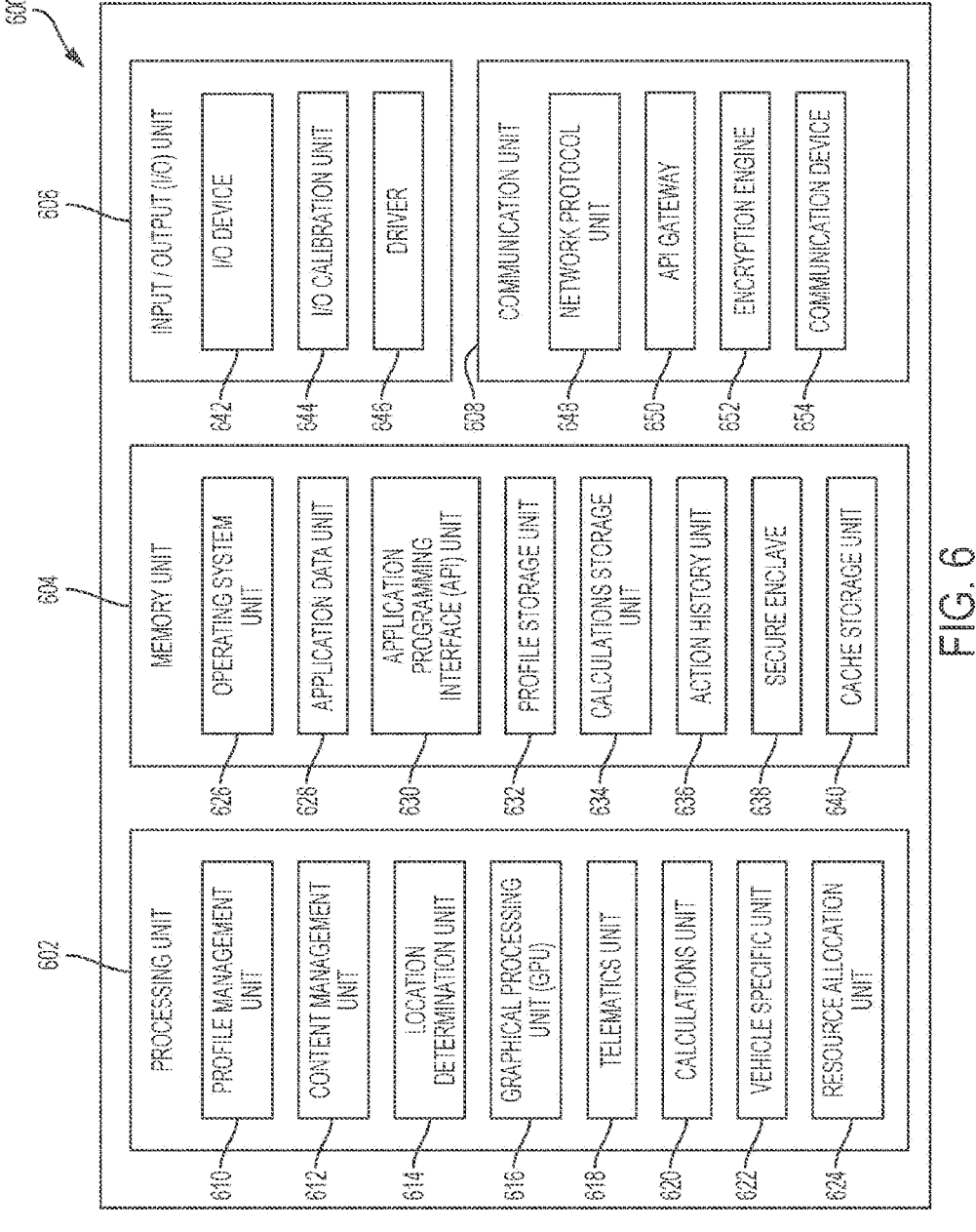
FIG. 6 is a bock diagram illustrating an exemplary computing environment according to the present disclosure.

The first server 502 may include various elements of a computing environment as described herein (e.g., computing environment 600 of FIGS. 6 and 14). For example, the first server 502 may include a processing unit 508, a memory unit 510, an input/output (I/O) unit 512, and/or a communication unit 514. Each of the processing unit 508, the memory unit 510, the input/output (I/O) unit 512, and/or the communication unit 514 may include one or more subunits and/or other computing instances as described herein for performing operations associated with collision detection and authority limit monitoring processes.

The second server 504 may be associated with an off-site computing device for processing data associated with railroad tracks and/or collision detection and authority limit monitoring operations. In some embodiments, the second server 504 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. The second server 504 may also include multiple servers and/or computing devices configured to communicate with one another and/or implement techniques described herein.

Figure 7:
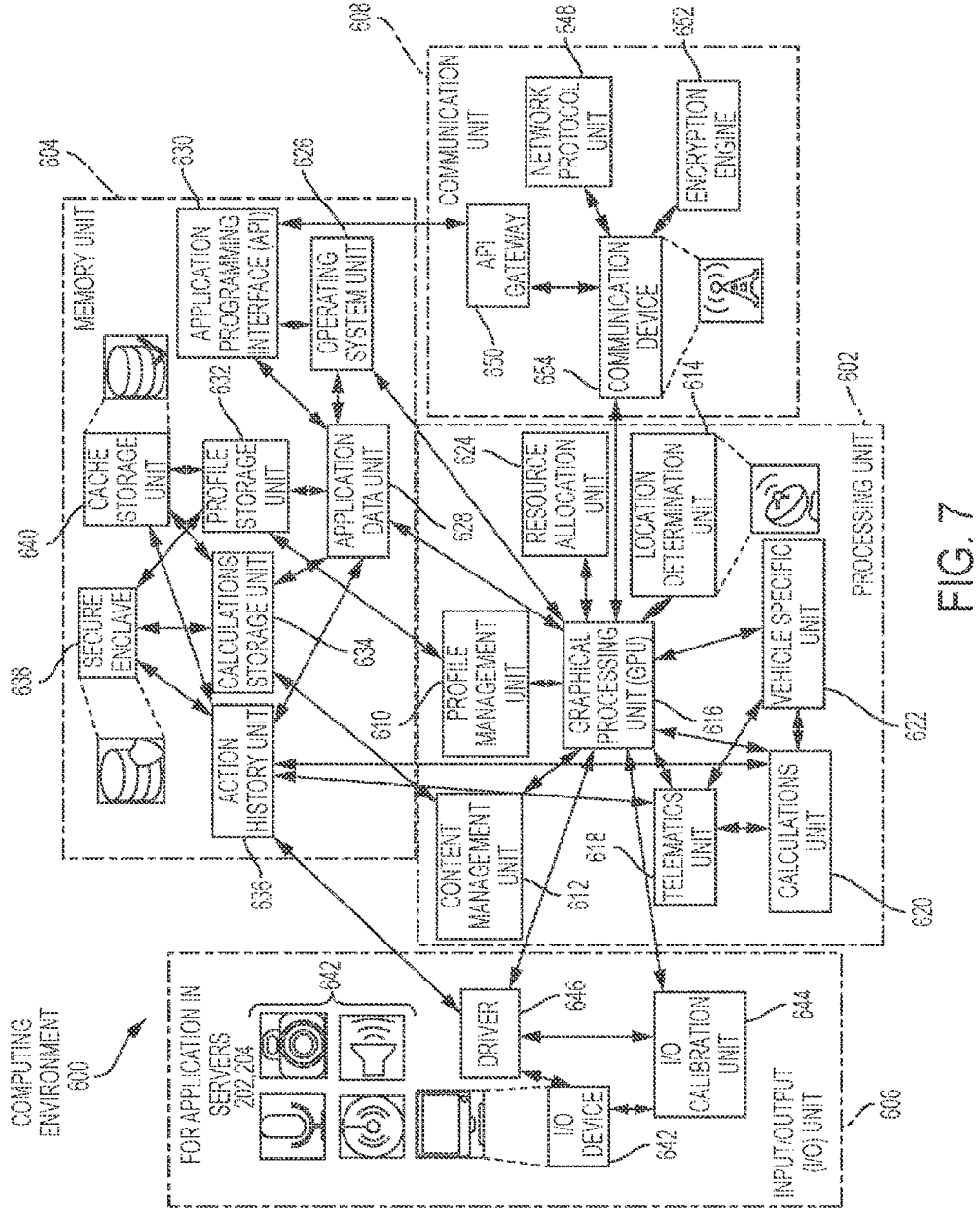
FIG. 7 is a block diagram illustrating an exemplary connectivity diagram of the computing environment of FIG. 6.

The second server 504 may include various elements of a computing environment as described herein (e.g., computing environment 600 of FIG. 6 and FIG. 7). For example, the second server 504 may include a processing unit 516, a memory unit 518, an input/output (I/O) unit 520, and/or a communication unit 522. Each of the processing unit 516, the memory unit 518, the input/output (I/O) unit 520, and/or the communication unit 522 may include one or more subunits and/or other computing instances as described herein for performing operations associated with collision detection and authority limit monitoring processes.

FIG. 6 and FIG. 7 illustrate exemplary functional and system diagrams of a computing environment 600 for collision detection, authority limit monitoring processes, and associated image processing techniques described herein. Specifically, FIG. 6 provides a functional block diagram of the computing environment 600, and FIG. 7 provides a detailed system diagram of the computing environment 600. Additionally, any units and/or subunits described herein with reference to the computing environment 600 of FIG. 6 and/or FIG. 7 may be included in one or more elements of FIG. 5, such as the first server 502 and/or the second server 504. The computing environment 600 and/or any of its units and/or subunits described herein may include general hardware, specifically-purposed hardware, and/or software.

The computing environment 600 may include, among other elements, a processing unit 602, a memory unit 604, an input/output (I/O) unit 606, and/or a communication unit 608. As described herein, each of the processing unit 602, the memory unit 604, the I/O unit 606, and/or the communication unit 608 may include and/or refer to a plurality of respective units, subunits, and/or elements. Furthermore, each of the processing unit 602, the memory unit 604, the I/O unit 606, and/or the communication unit 608 may be operatively and/or otherwise communicatively coupled with each other so as to facilitate collision detection, authority limit monitoring processes, and associated image processing techniques described herein. Further, the processing unit 602, the memory unit 604, the I/O unit 606, and/or the communication unit 608 may refer to the processing unit 508, the memory unit 510, the I/O unit 512, and/or the communication unit 514 of the first server 502 of FIG. 5. Additionally, the processing unit 602, the memory unit 604, the I/O unit 606, and/or the communication unit 608 may refer to the processing unit 516, the memory unit 518, the I/O unit 520, and/or the communication unit 522 of the second server 502 of FIG. 5.

The processing unit 602 may control any of the one or more units 604, 606, 608, as well as any included subunits, elements, components, devices, and/or functions performed by the units 604, 606, 608 included in the computing environment 600. The described sub-elements of the computing environment 600 may also be included in similar fashion in any of the other units and/or devices included in the system 500 of FIG. 5. Additionally, any actions described herein as being performed by a processor may be taken by the processing unit 602 alone and/or by the processing unit 508 in conjunction with one or more additional processors, units, subunits, elements, components, devices, and/or the like. Additionally, while only one processing unit 602 may be shown in FIG. 6 and/or FIG. 7, multiple processing units may be present and/or otherwise included in the computing environment 600 or elsewhere in the overall system (e.g., elements of collision detection and safety system 100). Thus, while instructions may be described as being executed by the processing unit 602 (and/or various subunits of the processing unit 602), the instructions may be executed simultaneously, serially, and/or otherwise by one or multiple processing units.

In some embodiments, the processing unit 602 may be implemented as one or more computer processing unit (CPU) chips and/or graphical processing unit (GPU) chips and may include a hardware device capable of executing computer instructions. The processing unit 602 may execute instructions, codes, computer programs, and/or scripts. The instructions, codes, computer programs, and/or scripts may be received from and/or stored in the memory unit 604, the I/O unit 606, the communication unit 608, subunits and/or elements of the aforementioned units, other devices and/or computing environments, and/or the like.

In some embodiments, the processing unit 602 may include, among other elements, subunits such as a profile management unit 610, a content management unit 612, a location determination unit 614, a graphical processing unit (GPU) 616, a telematics unit 618, a calculations unit 620, a vehicle specific unit 622, and/or a resource allocation unit 624. Each of the aforementioned subunits of the processing unit 602 may be communicatively and/or otherwise operably coupled with each other.

The profile management unit 610 may facilitate generation, modification, analysis, transmission, and/or presentation of a profile associated with a railroad track. For example, the profile management unit 610 may operate a database associated with a railroad track and may manage information associated with the collision protection and safety system 100 as described herein. The profile management unit 610 may receive, process, analyze, organize, and/or otherwise transform any data received from the user and/or another computing element so as to generate a profile of a railroad track that includes route information, status information, track feature information, maintenance information, marker information, and/or location information of various rail elements.

The content management unit 612 may facilitate generation, modification, analysis, transmission, and/or presentation of user interfaces for controlling the collision protection and safety system 100 described herein. For example, the content management unit 612 may control the audio-visual environment and/or appearance of application data during execution of various processes. Media content for which the content management unit 612 may be responsible may include advertisements, images, text, themes, audio files, video files, documents, and/or the like. In some embodiments, the content management unit 612 may also interface with a third-party content server and/or memory location.

The location determination unit 614 may facilitate detection, generation, modification, analysis, transmission, and/or presentation of location information. Location information may include global positioning system (GPS) coordinates, a mile marker, an Internet protocol (IP) address, a media access control (MAC) address, geolocation information, an address, a port number, a zip code, a server number, a proxy name and/or number, device information (e.g., a serial number), and/or the like. In some embodiments, the location determination unit 614 may include various sensors, a radar, and/or other specifically-purposed hardware elements for the location determination unit 614 to acquire, measure, and/or otherwise transform location information. In some embodiments, location-acquiring hardware may be utilized by the location determination unit 614 for determining locations of the rail vehicle and/or reference locations during operation.

The GPU unit 616 may facilitate generation, modification, analysis, processing, transmission, and/or presentation of data captured by the rail vehicle. In some embodiments, the GPU unit 616 may be utilized to render visual content for presentation on a user device, analyze vehicle information data (e.g., sensor readings), and/or the like. The GPU unit 616 may also include multiple GPUs and therefore may be configured to perform and/or execute multiple processes in parallel.

The telematics unit 618 may facility operation of the telematics device as discussed above. The telematics unit 618 may control the operation of one or more vehicle status sensors located on the rail vehicle 140. The telematics unit may further facilitate the collection of vehicle information as discussed above, the communication of signals and/or data between the rail vehicle 140 and other elements of the safety system 100, and/or the like.

The calculations unit 620 may facilitate the computation of various pieces of information during operation of the collision protection and safety system 100. For example, the calculations unit 620 may determine a distance from a reference location, and/or any other value.

The vehicle specific unit 622 may facilitate operation of the rail vehicle in its specific capacity in performing rail maintenance. For example, the vehicle specific unit 622 may coordinate a tamping operation if the rail vehicle 140 is a tamping machine. The vehicle specific unit 622 may further coordinate a stoneblowing operation if the rail vehicle 140 is a stoneblowing machine.

The resource allocation unit 624 may facilitate the determination, monitoring, analysis, and/or allocation of computing resources throughout the collision protection and safety system 100 described herein. For example, the collision protection and safety system 100 may facilitate a high volume of (e.g., multiple) processes simultaneously. As such, computing resources of the computing environment 600 (and/or any subunit of the aforementioned units) such as processing power, data storage space, network bandwidth, and/or the like may be in high demand at various times during operation. Accordingly, the resource allocation unit 624 may be configured to manage the allocation of various computing resources as they are required by particular units and/or subunits of the computing environment 600 and/or other computing environments. In some embodiments, the resource allocation unit 624 may include sensors and/or other specially-purposed hardware for monitoring performance of each unit and/or subunit of the computing environment 600, as well as hardware for responding to the computing resource needs of each unit and/or subunit. In some embodiments, the resource allocation unit 624 may utilize computing resources of a second computing environment separate and distinct from the computing environment 600 to facilitate a desired operation.

For example, the resource allocation unit 624 may determine a number of simultaneous communication connections and/or incoming requests for data. The resource allocation unit 624 may then determine that the number of simultaneous communication connections and/or incoming requests for data meets and/or exceeds a predetermined threshold value. Based on this determination, the resource allocation unit 624 may determine an amount of additional computing resources (e.g., processing power, storage space of a particular non-transitory computer-readable memory medium, network bandwidth, and/or the like) required by the processing unit 602, the memory unit 604, the I/O unit 606, the communication unit 608, and/or any subunit of the aforementioned units for safe and efficient operation of the computing environment 600 while supporting the number of simultaneous communication connections and/or incoming requests. The resource allocation unit 624 may then retrieve, transmit, control, allocate, and/or otherwise distribute determined amount(s) of computing resources to each element (e.g., unit and/or subunit) of the computing environment 600 and/or another computing environment.

In some embodiments, factors affecting the allocation of computing resources by the resource allocation unit 624 may include the number of ongoing communication connections and/or other communication channel connections, a number of image analysis and/or reporting processes, a duration of time during which computing resources are required by one or more elements of the computing environment 600, and/or the like. In some embodiments, computing resources may be allocated to and/or distributed amongst a plurality of second computing environments included in the computing environment 600 based on one or more factors mentioned above. In some embodiments, the allocation of computing resources of the resource allocation unit 624 may include the resource allocation unit 624 flipping a switch, adjusting processing power, adjusting memory size, partitioning a memory element, transmitting data, controlling one or more input and/or output devices, modifying various communication protocols, and/or the like. In some embodiments, the resource allocation unit 624 may facilitate utilization of parallel processing techniques such as dedicating a plurality of GPUs included in the processing unit 602 for processing data.

In some embodiments, the memory unit 604 may be utilized for storing, recalling, receiving, transmitting, and/or accessing various files and/or information during operation of the computing environment 600. For example, the memory unit 604 may be utilized for storing collected data, vehicle information readings, distance readings, image frames, video streams, storing, recalling, and/or updating railroad track profile information, marker information, track feature information, and/or the like. The memory unit 604 may include various types of data storage media such as solid state storage media, hard disk storage media, and/or the like. The memory unit 604 may include dedicated hardware elements such as hard drives and/or servers, as well as software elements such as cloud-based storage drives. For example, the memory unit 604 may include various subunits such as an operating system unit 626, an application data unit 628, an application programming interface (API) unit 630, a profile storage unit 632, a calculations storage unit 634, an action history unit 636, a secure enclave 638, and/or a cache storage unit 640.

The memory unit 604 and/or any of its subunits described herein may include random access memory (RAM), read only memory (ROM), and/or various forms of secondary storage. RAM may be used to store volatile data and/or to store instructions that may be executed by the processing unit 602. For example, the data stored may be a command, a current operating state of the computing environment 600, an intended operating state of the computing environment 600, and/or the like. As a further example, data stored in the memory unit 604 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions.

In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 604 may include one or more databases for storing any data described herein. Additionally or alternatively, one or more secondary databases located remotely from the computing environment 600 may be utilized and/or accessed by the memory unit 604.

The operating system unit 626 may facilitate deployment, storage, access, execution, and/or utilization of an operating system utilized by the computing environment 600 and/or any other computing environment described herein. In some embodiments, the operating system may include various hardware and/or software elements that serve as a structural framework for the processing unit 602 to execute various collision protection and safety system 100 operations described herein. The operating system unit 626 may further store various pieces of information and/or data associated with operation of the operating system and/or the computing environment 600 as a whole, such as a status of computing resources (e.g., processing power, memory availability, resource utilization, and/or the like), runtime information, modules to direct execution of operations described herein, and/or the like.

The application data unit 628 may facilitate deployment, storage, access, execution, and/or utilization of an application utilized by the computing environment 600 and/or any other computing environment described herein (e.g., the first server 502 and/or the second server 504 of FIG. 5). For example, users may be required to download, access, and/or otherwise utilize a software application on a computing device in order for various operations described herein to be performed. As such, the application data unit 628 may store any information and/or data associated with the application. Information included in the application data unit 628 may be used by a user and/or computer processor to execute various operations described herein. The application data unit 628 may further store various pieces of information and/or data associated with operation of the application and/or the computing environment 600 as a whole, such as a status of computing resources (e.g., processing power, memory availability, resource utilization, and/or the like), runtime information, modules to direct execution of operations described herein, and/or the like.

The API unit 630 may facilitate deployment, storage, access, execution, and/or utilization of information associated with APIs of the computing environment 600 and/or any other computing environment described herein. For example, the computing environment 600 may include one or more APIs for various devices, applications, and/or computing environments to communicate with each other and/or utilize the same data. Accordingly, the API unit 630 may include API databases containing information that may be accessed and/or utilized by applications and/or operating systems of other devices and/or computing environments. In some embodiments, each API database may be associated with a customized physical circuit included in the memory unit 604 and/or the API unit 630. Additionally, each API database may be public and/or private, and so authentication credentials may be required to access information in an API database.

The profile storage unit 632 may facilitate deployment, storage, access, and/or utilization of information associated with profiles of railroad tracks, track features, reference locations, elements of the collision protection and safety system 100, and/or rail markers. For example, the profile storage unit 632 may store a track profile, identification information, marker information, track feature information, location information, and/or metadata associated with a railroad track and/or a railroad chassis. In some embodiments, the profile storage unit 632 may communicate with the profile management unit 610 to receive and/or transmit information associated with a railroad profile.

The calculations storage unit 634 may facilitate deployment, storage, access, and/or utilization of information calculated by the computing environment 600. For example, calculated values associated with amounts of ballast to be dispensed at a particular location, heights up to which rails are to be raised at a particular location, distances traveled, and/or the like may be stored in the calculations storage unit 634.

The action history unit 636 may facilitate deployment, storage, access, analysis, and/or utilization of information associated with actions taken by the collision protection and safety system 100 during operation. Each movement by each individual element of the collision protection and safety system 100 may be monitored and tracked and stored in the action history unit 636. In this manner, a log of activity of the road collision protection and safety system 100 may be saved in the action history unit 636 for later processing.

The secure enclave 638 may facilitate secure storage of data. In some embodiments, the secure enclave 638 may include a partitioned portion of storage media included in the memory unit 604 that is protected by various security measures. For example, the secure enclave 638 may be hardware secured. In other embodiments, the secure enclave 638 may include one or more firewalls, encryption mechanisms, and/or other security-based protocols. Authentication credentials of a user may be required prior to providing the user access to data stored within the secure enclave 638.

The cache storage unit 640 may facilitate short-term deployment, storage, access, analysis, and/or utilization of data. In some embodiments, the cache storage unit 640 may serve as a short-term storage location for data so that the data stored in the cache storage unit 640 may be accessed quickly. In some embodiments, the cache storage unit 640 may include RAM and/or other storage media types that quickly recall of stored data. The cache storage unit 640 may include a partitioned portion of storage media included in the memory unit 604.

The I/O unit 606 may include hardware and/or software elements for enabling the computing environment 600 to receive, transmit, and/or present information. For example, elements of the I/O unit 606 may be used to capture data associated with railroad tracks, display images of railroad tracks, receive user input from a user via a user device, present information to a user, and/or the like. In this manner, the I/O unit 606 may provide the computing environment 600 an interface with a railroad track and/or a human user. As described herein, the I/O unit 606 may include subunits such as an I/O device 642, an I/O calibration unit 644, and/or a driver 646.

The I/O device 642 may facilitate the receipt, transmission, processing, presentation, display, input, and/or output of information as a result of executed processes described herein. In some embodiments, the I/O device 642 may include a plurality of I/O devices. For example, the I/O device 642 may include a variety of elements that capture data associated with railroad tracks such as a sensor, a laser, a light, a camera, a receiver, and/or the like. The I/O device 642 may also include hardware for interfacing with a user, such as a keyboard, a touchscreen, a button, a sensor, a biometric scanner, a laser, a microphone, a camera, and/or another element for receiving and/or collecting input from a user. Additionally and/or alternatively, the I/O device 642 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 642 may communicate with one or more elements of the processing unit 602 and/or the memory unit 604 to execute operations described herein.

The I/O calibration unit 644 may facilitate the calibration of the I/O device 642. For example, the I/O calibration unit 644 may detect and/or determine one or more settings of the I/O device 642, and then adjust and/or modify settings so that the I/O device 642 may operate more efficiently.

In some embodiments, the I/O calibration unit 644 may utilize a driver 646 (or multiple drivers) to calibrate the I/O device 642. For example, a driver 646 may be installed on a computer to set the frequency of the measuring device as discussed above. In some embodiments, the I/O device 642 may be calibrated by the I/O calibration unit 644 by based on information included in the driver 646.

The communication unit 608 may facilitate establishment, maintenance, monitoring, and/or termination of communications (e.g., a communication connection) between computing devices and/or elements of the collision protection and safety system 100 described herein. The communication unit 608 may further communicate between various elements (e.g., units and/or subunits) of the computing environment 600. In some embodiments, the communication unit 608 may include a network protocol unit 648, an API gateway 650, an encryption engine 652, and/or a communication device 654. The communication unit 608 may include hardware and/or software elements.

The network protocol unit 648 may facilitate establishment, maintenance, and/or termination of a communication connection between computing environment 600 and another computing environment (e.g., the first server 502 and the second server 504 of FIG. 5) by way of a network. For example, the network protocol unit 648 may detect and/or determine a communication protocol required by a particular network and/or network type. Communication protocols utilized by the network protocol unit 648 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication between the computing environment 600 and any other device, as well as any element internal to the computing environment 600, may include transforming and/or translating data from being compatible with a first communication protocol to being compatible with a second communication protocol. In some embodiments, the network protocol unit 648 may determine and/or monitor an amount of data traffic to consequently determine which particular network protocol is to be used for establishing a communication connection, transmitting data, and/or performing other operations described herein.

The API gateway 650 may facilitate other devices and/or computing environments to access the API unit 630 of the memory unit 604 of the computing environment 600. For example, a user device may access the API unit 630 via the API gateway 650. In some embodiments, the API gateway 650 may be required to validate user credentials associated with a user of a user device prior to providing access to the API unit 630 to the user. The API gateway 650 may include instructions for the computing environment 600 to communicate and share information with another device.

The encryption engine 652 may facilitate translation, encryption, encoding, decryption, and/or decoding of information received, transmitted, and/or stored by the computing environment 600. Using the encryption engine, each transmission of data may be encrypted, encoded, and/or translated for security reasons, and any received data may be encrypted, encoded, and/or translated prior to its processing and/or storage. In some embodiments, the encryption engine 652 may generate an encryption key, an encoding key, a translation key, and/or the like, which may be transmitted along with any data content.

The communication device 654 may include a variety of hardware and/or software specifically purposed to communicate between the computing environment 600 and another device, as well as communication between elements of the computing environment 600. In some embodiments, the communication device 654 may include one or more radio transceivers, chips, analog front end (AFE) units, antennas, processing units, memory, other logic, and/or other components to implement communication protocols (wired or wireless) and related functionality for facilitating communication between the computing environment 600 and any other device. Additionally and/or alternatively, the communication device 654 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

While various embodiments in accordance with the disclosed principles have been described above, it should be understood that they have been presented by way of example only, and are not limiting. For example, while the above disclosure describes much of the safety system 100 operation relative to the CLP unit 150 of the rail vehicles 140, the PPU 134 of rail workers 130 may operate in the same way as CLP unit 150 and may be interchangeably used. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A method for providing rail worker safety, comprising:
receiving, at a dispatcher processor of a control center, a location of a rail vehicle in a work zone;
comparing the location of the rail vehicle with at least one geographical boundary of the work zone;
determining if a first distance between the location of the rail vehicle and the at least one geographical boundary is less than a threshold;
transmitting a first warning signal to the rail vehicle if the first distance is less than a threshold; and
activating a first alarm of a first alarm system when a vehicle device receives the first warning signal; and
determining a distance between the rail vehicle and a second rail vehicle unit in real time, and activating a collision alarm of the first alarm system when the distance between the rail vehicle and a second rail vehicle is below a collision threshold.

2. The method of claim 1, further comprising transmitting a second warning signal to the rail vehicle if the location of the rail vehicle has gone outside the at least one geographical boundary, and activating a second alarm of the first alarm system when the vehicle device receives the second warning signal.

3. The method of claim 1, wherein the first alarm system includes an audible alarm unit and a visual alarm unit.

4. The method of claim 1, further comprising determining a distance between the rail vehicle and a rail worker unit in real time, and activating a collision alarm of the first alarm system when the distance between the rail vehicle and the worker unit is below a collision threshold.

5. The method of claim 1, further comprising setting the at least one geographical boundary at a control center.

6. The method of claim 1, further comprising determining whether the rail vehicle is operating in a first mode or a second mode, wherein the first alarm system is configured to generate the first alarm based on whether the rail vehicle is operating in the first mode or the second mode.

7. The method of claim 1, further comprising displaying the location of the rail vehicle relative to a first boundary of the at least one geographical boundary.

8. The method of claim 7, further comprising collecting vehicle information of the rail vehicle by a telematics unit of the rail vehicle and transmitting the vehicle information from the telematics unit to the dispatcher processor.

9. The method of claim 1, further comprising:

transmitting, by the dispatcher processor, an alarm signal to a wayside unit, and transmitting, by the wayside unit the first warning signal to the vehicle device.

10. A railway safety system, comprising:

a vehicle unit operable to be coupled to a rail vehicle, the vehicle unit including:

a location determination unit operable to determine a location of the rail vehicle, a communications unit operable to transmit the location of the rail vehicle to a dispatcher processor and to receive an alarm signal from the dispatcher processor indicating that a distance between the rail vehicle and a boundary is less than a threshold, and an alarm operable to generate at least one of an audio or visual alarm in response to the alarm signal, and a collision detection unit operable to detect a distance between the rail vehicle and a second rail vehicle.

11. The railway safety system of claim 10, wherein the vehicle unit includes a collision detection unit operable to detect a distance between the rail vehicle and a personal protection unit of a rail worker.

12. The railway safety system of claim 11, wherein the alarm is operable to generate the alarm when a distance between the rail vehicle and the personal protection unit is less than a threshold.

13. The railway safety system of claim 10, wherein the vehicle unit is configured to be in communication with a dispatcher processor of a control room.

14. The railway safety system of claim 13, wherein the alarm is operable to generate the alarm when a distance between the rail vehicle and the second rail vehicle is less than a threshold.

15. The railway safety system of claim 11, wherein the vehicle unit includes a chirping radio operable to detect a distance between the rail vehicle and another object.

16. The railway safety system of claim 10, further comprising a telematics unit operable to collect vehicle information of the rail vehicle, wherein the communications unit is operable to transmit the vehicle information to the dispatcher processor.

17. A method for rail worker safety, comprising transmitting location data of a rail vehicle to a dispatcher processor;

receiving a signal indicating that the rail vehicle has exceeded an authorized limit from the dispatcher processor;

transmitting, in response to the signal, an alarm to an operator of the rail vehicle; and storing information in a telematics unit of the rail vehicle that includes a time that the alarm was transmitted to the operator.

18. The method of claim 17, further comprising transmitting a collision alarm to the rail vehicle when a distance between the rail vehicle and a second rail vehicle is less than a threshold, and storing collision information in the telematics unit of the rail vehicle, the collision information including a time that the collision alarm was transmitted to the operator.

19. The method of claim 17, further comprising transmitting a collision alarm to the rail vehicle when a distance between the rail vehicle and a personal protection unit of a rail worker is less than a threshold, and storing collision information in the telematics unit of the rail vehicle, the collision information including a time that the collision alarm was transmitted to the operator.

20. The method of claim 17, further comprising setting the authorized limit at the dispatcher processor.

* * * * *